June 12, 1962 W. M. VAN CAMP ETAL 3,038,246
FABRICATION OF HOLLOW ARTICLES
Filed Jan. 18, 1956 2 Sheets-Sheet 1
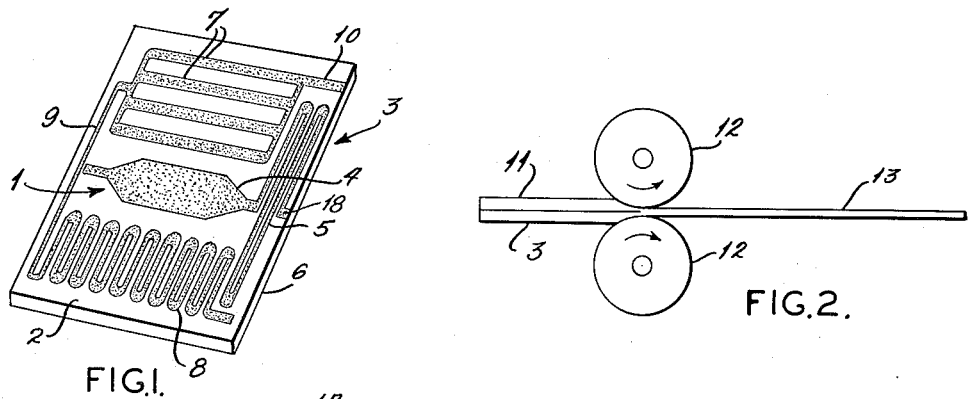
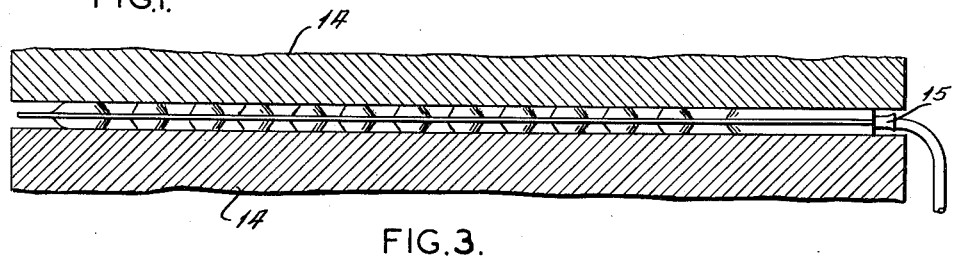
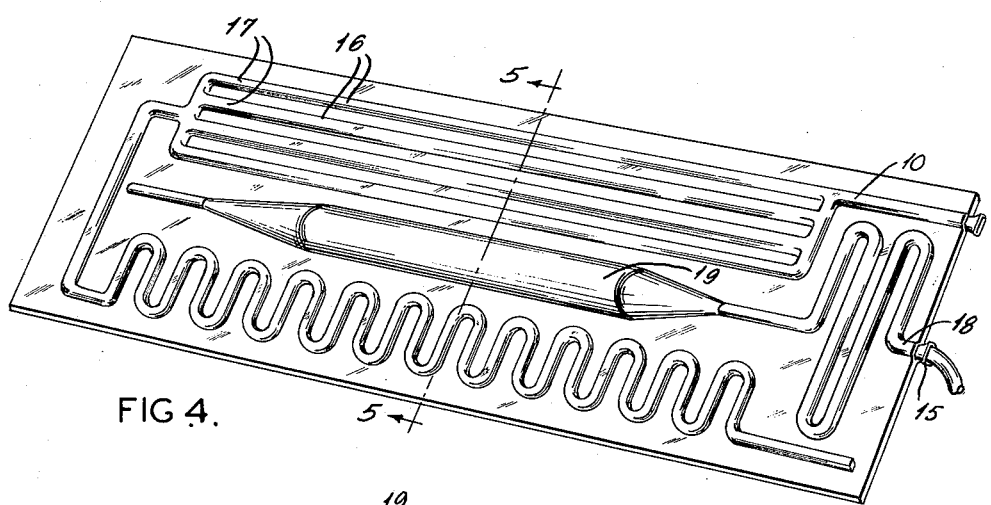
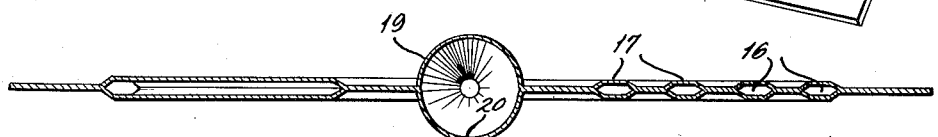
INVENTORS:
WILLIAM M. VAN CAMP
DONALD K. BLEIKAMP
By Robert F. Russell
ATTORNEY June 12, 1962

W. M. VAN CAMP ETAL 3,038,246

FABRICATION OF HOLLOW ARTICLES

Filed Jan. 18, 1956

INVENTORS:
WILLIAM M. VAN CAMP
DONALD K. BLEIKAMP

By

ATTORNEY

United States Patent Office 3,038,246
Patented June 12, 1962

3,038,246
FABRICATION OF HOLLOW ARTICLES
William M. Van Camp, Alton, Ill., and Donald K. Bleikamp, Berkeley, Mo., assignors to Olin Mathieson Chemical Corporation, East Alton, Ill., a corporation of Virginia
Filed Jan. 18, 1956, Ser. No. 559,948
9 Claims. (Cl. 29—157.3)

This invention relates to the manufacture of hollow articles and more specifically to the manufacture of hollow plates containing relatively large hollow expanses.

In a process for fabricating hollow panels, such as heat exchangers and the like, two or more sheets of metal are welded together in stack-like arrangement as by hot rolling as disclosed in U.S. Patent No. 2,690,002. Prior to welding the sheets together a pattern of weld inhibiting material is applied to at least one of the contacting surfaces of each pair of interengaging surfaces of the sheets in each layer of the stack. A narrow strip of weld inhibiting material is also applied to these surfaces from the imprinted pattern design to an edge of the sheet to facilitate expansion of the panel. Following the rolling operation in which the sheets are welded together, the resultant panel is usually annealed to make it more pliable and it is then expanded by inserting a nozzle into the edge portion of the narrow unwelded strip and applying a fluid pressure of sufficient magnitude to permanently distend the unwelded internal areas of the panel. During the expansion step the distention of the panels may be limited by restraining platens in which case the distended portion of the panel is provided with outer surfaces conforming to the surfaces of the platens. Following expansion of the panel any residual weld inhibiting material is removed from the expanded portion by any appropriate means such as steam.

Although this invention is directed primarily to the fabrication of panels which incorporate the aforementioned process, this invention is equally applicable to hollow panels made by other processes such as panels in which any two sheets of material, such as plastic, are bonded together, as by an adhesive.

In the fabrication of heat exchanger panels it is often desirable to include in the conduit system a portion of high capacity to serve as an accumulator for a liquid medium, such as a refrigerant. In some instances the accumulator can serve as a boiler. The manufacture of high capacity accumulators or boilers by the pressure welding and expansion method presents two major problems. First, during the expansion to the required height to obtain the required capacity, metal is drawn from the adjacent areas of the panel to an uneven degree resulting in distortions such as wrinkles, and stresses which warp the panel so that it is generally not in usable or saleable condition. Second, in normal operation the panels must withstand a pressure, for example, in refrigerator panels such pressure is normally about 200 to 300 p.s.i., which tends to result in further distortion of the panel.

It is therefore an object of this invention to expand relatively large unwelded areas of a hollow panel without undue warping or other distortion of the panel.

Another object of this invention is to prevent the distortion of hollow panels having relatively large unwelded portions when such portions are subjected to a fluid pressure.

Another object of this invention is to expand a large hollow expanse in a panel without clamping the portion of the panel adjacent the large hollow portion.

Additional objects and advantages will become apparent from the following description and drawings in which:

FIGURE 1 illustrates an embodiment of the invention showing a plan view of a sheet prior to being welded to another sheet to make up a panel with a pattern of weld inhibiting material applied to a surface of the sheet;

FIGURE 2 is an elevation view of the sheet of FIGURE 1 and with a second sheet placed in face-to-face relationship thereto and showing the sheets being rolled in a mill to form a panel;

FIGURE 3 is a vertical partial sectional view of the resultant panel of FIGURE 2 after it has been expanded between a pair of restraining platens and showing the nozzle still in place in the panel;

FIGURE 4 is a perspective view of the panel with the boiler section expanded to its full height and with the nozzle still in place in the panel;

FIGURE 5 is a sectional view taken on the line 5—5 in FIGURE 4;

Figure 6:
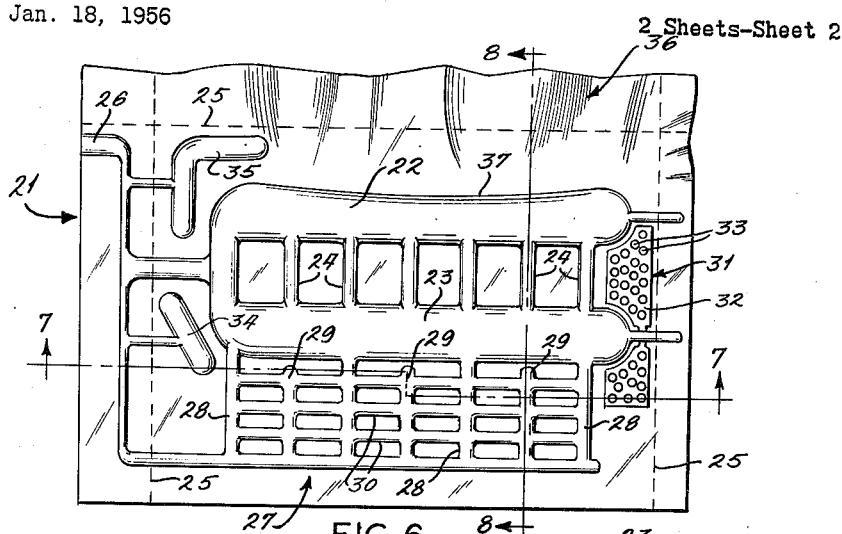
FIGURE 6 is a plan view similar to FIGURE 4, but illustrating another embodiment of the invention.

Briefly the invention comprehends fabrication of a hollow welded panel having a large unwelded portion, referred to hereinafter as an accumulator or boiler, and a reinforcing portion adjacent the accumulator to prevent warping or other distortion of the panel. The reinforcing portion is either expanded prior to or simultaneously with the expansion of the accumulator. The reinforcing portion stiffens the panel and prevents warping of the panel upon expansion of the accumulator to its full distension. The reinforcing portion may be integrally connected in series or parallel with the accumulator so that a fluid circulating through the accumulator will also circulate through the reinforcing portion, which then provides additional capacity or the reinforcing portion may be entirely separate from the accumulator.

By way of example, referring to FIGURE 1 a pattern of weld inhibiting material 1 such as a flowable composition containing graphite is applied to a clean surface 2 of a sheet of metal 3. In this embodiment the pattern of weld inhibiting material 1 defines a large generally oval or cigar shaped area 4 which will become an accumulator 19 upon expansion of the welded panel. A zig-zag or serpentine strip 5 of weld inhibiting material provides a reinforcing portion and connects one end of the oval pattern with an edge 6 of the sheet. About the accumulator design is a reinforcing portion provided by a plurality of parallel strips 7 of weld inhibiting material adjacent one side of the accumulator and by a zig-zag or serpentine strip 8 of weld inhibiting material adjacent the other side of the accumulator. The parallel and serpentine strips are interconnected by another strip 9 to permit flow of fluid therebetween after the panel blank is completed. Still another strip 10 of weld inhibiting material connects the reinforcing pattern and an edge of the sheet. A second metal sheet 11 having peripheral dimensions similar to the first sheet 3 is placed on the surface of the first sheet to which the weld inhibiting material has been applied, in stack-like arrangement. The sheets are then passed through a rolling mill 12 as shown in FIGURE 2 and welded together to form a panel 13. The rolling operation elongates the sheets 3 and 11 in the direction of rolling but the width of the sheet remains substantially unchanged. It is the general practice to heat the sheets prior to the rolling operation but whether or not this is necessary depends on the inherent characteristics of the metal being welded together and such practice is well understood in the rolling art. The resultant panel 13 is then usually annealed so that it will be more pliable when the unwelded portion defined by the weld-inhibiting material 1 is expanded. Following the annealing operation the panel is inserted between a pair of restraining platens 14 as shown in FIGURE 3. A nozzle 15 is inserted into the expansion strip 10 leading from the reinforcing pattern 7 and 8 to the edge of the panel and this portion of the panel is then expanded by a fluid pressure introduced through the nozzle 15. This fluid pressure is normally sufficiently high to rupture the panel 13 if it were not restrained by the platens 14. The partially expanded panel 13 is then removed from between the platens 14. As shown in FIGURE 4 the resultant reinforcing tubes 16 have a flat outer surface 17 through their engagement with the flat platens 14 during expansion of the panel. The nozzle 15 is then inserted into the second expansion strip 18 opening through the edge of the panel and the serpentine portion 5 of the expansion strip and the accumulator 19 are then expanded. The serpentine strip 5 will not be flat because, as shown, the accumulator 19 is inflated without the restraint of platens or dies. The accumulator 19 may be expanded between flat platens in the same manner as the reinforcing portion 16 was expanded but with the platens spaced apart a greater distance. Even under these conditions the serpentine strip 5 will not be flat because the platens will be spaced apart a distance much greater than the height to which this strip could be expanded because of the narrow width of the strip. Following expansion of the panel the weld inhibiting material is removed from the hollow portion in any appropriate manner such as by steam. The panel is trimmed and is now ready for subsequent forming operations, such as bending into the form of a refrigerator panel shown in FIGURE 11.

The reinforcing portion of the panel is normally expanded between the platens at a pressure of between 3000 to 4000 p.s.i. for a 1100 aluminum panel having a .060 inch thickness, a tube width of about .375 inch and a tube height of about .180 inch. In such a panel the accumulator width will normally be between ½ and 1½ inches and will normally be expanded without restraint to a height somewhat less than the width, resulting in a substantially elliptical or circular cross sectional configuration 20. The accumulator is expanded at a pressure sufficiently great that the material of the accumulator will have exceeded its elastic limit, but will not have reached its yield point, and at a pressure in excess of that to which the accumulator will be subjected in actual use. A pressure of 700 p.s.i. is generally sufficient for a 1¼ inch diameter. If the accumulator is expanded at a pressure lower than this, such as 500 p.s.i., a subsequent application of 300 p.s.i. pressure will cause the panel to distort which is highly undesirable in a finished article such as an evaporator panel for a domestic refrigerator. The reinforcing portion of the panel adjacent the accumulator will tend to counteract such distortion but the accumulator should still be expanded to near its yield point to further cut down such tendency to distort.

Many factors affect the tendency of a panel to warp during inflation, such as the inherent characteristics of the metal, the thickness of the panel, the dimensions of the accumulator, the pressure at which the accumulator is expanded, whether or not the panel has been restrained by being clamped between blocks during initial expansion of the panel as well as integral reinforcement of the panel adjacent the accumulator area. Not only must warping and other distortion such as excessive pulling-in of the metal adjacent the accumulator be prevented during expansion of the accumulator but also such warping and other distortion must be prevented under normal operating conditions to which the panel is to be subjected. In such instances integral reinforcement of the panel adjacent to the accumulator is sufficient in itself to satisfactorily limit such distortion during expansion of the accumulator.

Figure 7:
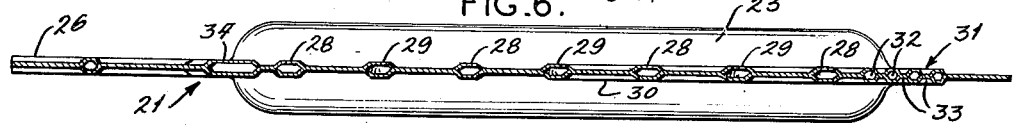
FIGURE 7 is a sectional view taken on the line 7—7 in FIGURE 6.
Figure 8:
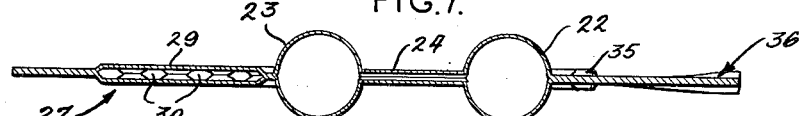
FIGURE 8 is a sectional view taken on line 8—8 in FIGURE 6.

FIGURE 6 shows another embodiment of a reinforced accumulator panel 21. In this embodiment the accumulators 22 and 23 are arranged in parallel and interconnected by conduits 24. The broken line 25 indicates the panel periphery after it has been trimmed. It should be noted that whereas the reinforcing portion 16 and the accumulator 19 of the panel shown in FIGURES 1 through 5 were expanded through separate external expansion connections 10 and 18 the panel shown in FIGURES 6 through 8 is expanded through a single connection 26 and the reinforcing portion 27 and the accumulators 22 and 23 are interconnected. A panel of this nature is first expanded between restraining platens at a pressure well above the rupture pressure of the panel if unrestrained.

During such expansion both the reinforcing portion 27 and the accumulators 22 and 23 will be expanded to the same height. Subsequent thereto the panel is removed from between the restraining platens and the accumulators 22 and 23 are expanded to their full height at a relatively lower pressure to distend the expanded portion between the elastic limit and yield point of the metal.

The reinforcing portion 27 of the panel shown in FIGURES 6 through 8 includes a plurality of conduits 28 opening into the side of one of the accumulators 23 and intermediate each such conduit is another conduit 29 terminating short of the accumulator 23. Each of these conduits is interconnected by transverse conduits 30. It should be noted that either the conduits 28 which open into the accumulator or the conduits 29 which stop just short of the accumulator are generally sufficient in themselves to reinforce this portion subject to proper spacing and size with or without the transverse interconnecting conduits 30. Adjacent one end of the accumulators is another reinforcing portion consisting of a polka dot expanded section 31. The portion 32 between the polka dots is expanded and the polka dots 33 themselves are areas to which weld inhibiting material was not applied so that the sheets are welded together in this area. At the other end of the panel is shown a straight expanded portion 34 and L-shaped inflated portion 35 which prevent distortion of this portion of the panel. The conduits 24 interconnecting the accumulators 22 and 23 also prevent distortion of the panel particularly if the accumulators are of different configuration or size. It should be noted the panel has not been reinforced in the area 36 adjacent the accumulator 22 which results in this portion of the panel being pulled in toward the accumulator and warped and the adjacent side of the accumulator is curved as at 37.

To expand this panel it is first placed between a pair of restraining platens and the entire panel including the accumulator is expanded into engagement with these platens by a pressure above the rupture pressure of the panel if unrestrained. The panel is then removed from the platens and the accumulators are expanded without restraint at a substantially reduced pressure which will distort the metal to a degree above its elastic limit but below its yield point.

Figure 10:
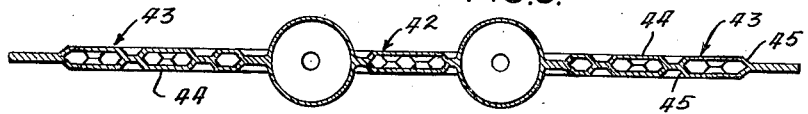
FIGURE 10 is a sectional view taken on the line 10—10 in FIGURE 9.
Figure 9:
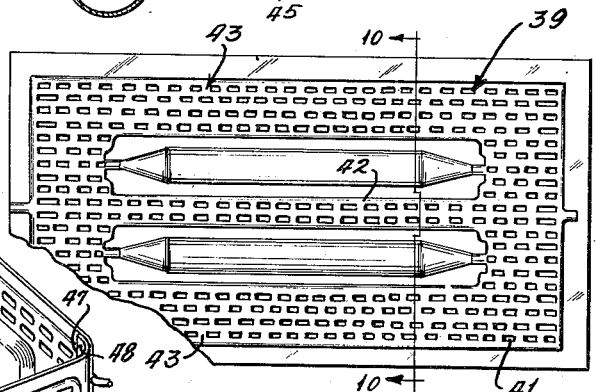
FIGURE 9 is a plan view similar to FIGURES 4 and 6, but illustrating still another embodiment of the invention.

FIGURES 9 and 10 show a preferred form of integral reinforcing, namely a waffle section 39. A waffle section has many uses in panels of this type particularly as accumulators in refrigerator evaporator panels. A waffle section is an expanded portion 40 of hollow panel having interspersed throughout the hollow portion small rectangular areas 41 in which the sheets have been welded together during the rolling operation. The corners of these welded rectangular portions are usually rounded off to permit greater expansion of the panel without rupture during expansion thereof. The waffle section 42 shown in the center of the panel has the welded rectangular portions aligned whereas in the side and end waffle sections 43 the adjacent rows of the rectangular portions are staggered. The staggered rows will obviously produce a stiffer section. In FIGURE 10 is shown a cross section of the panel indicating the distortion of the metal caused by the waffle pattern. The polka dot section 31 is similar to a waffle section except that the welded portions 33 are circular rather than square or rectangular as is a waffle section.

Any distortion of the panel out of the plane of the body of the panel such as the top 44 of the expanded waffle will act as a reinforcing member. The waffle pattern provides more distortion both longitudinally and transversely of the panel than do the other reinforcing sections and therefore it provides a stiffer section. Also a waffle section provides a substantially great area 45 perpendicular to the plane of the panel which adds to its reinforcing characteristics. It is highly desirable that the reinforcing portion of an accumulator panel be in some manner incorporated into the fluid circuit in the panel. Therefore it is not always possible or desirable to use a waffle or polka dot section. Irrespective of the reinforcing pattern utilized this invention makes possible the integral reinforcing of panels at a minimum of expense without necessitating the use of separate reinforcing members such as rods or bars secured to the panel.

Figure 11:
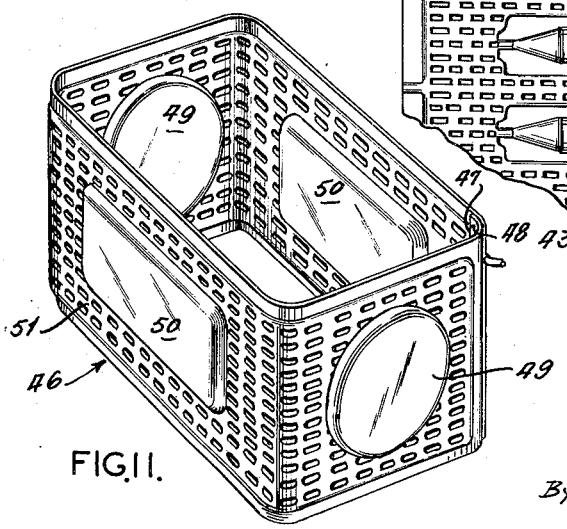
FIGURE 11 shows a further embodiment in which a panel is bent to form a refrigerator evaporator.

FIGURE 11 shows a refrigerator evaporator panel 46 bent to shape with the ends 47 of the panel secured together as by spot welding 48. One wall of the evaporator has a circular accumulator 49 and another wall has a square accumulator 50. A reinforcing waffle section 51 surrounds both accumulators. All of the aforementioned accumulators may be expanded without restraint in which event they are arched, or between restraining platens in which event the outer surfaces are flat.

The invention may be utilized in conjunction with any type of hollow expanded panel or other hollow articles and is not limited to use with metal panels nor is it necessary that the panels be fabricated by the aforementioned rolling process although this process is the most convenient and economical for such fabrication. The invention is equally applicable for use with panels which have been spot welded or have been pressure welded together in other manners or with panels which have been bonded together by an adhesive. Many other reinforcing patterns will become apparent to one skilled in the art and the invention is therefore not to be limited to the patterns herein disclosed. The previously described invention is therefore not to be limited to the specific embodiments, materials or details disclosed herein except as set forth in the appendent claims.

We claim:

1. A method for preventing distortion in a hollow panel during distention by inflation of a relatively large first unjoined area comprising applying a pattern of weld-inhibiting material to the surface of a ductile sheet defining said large unjoined area, applying weld-inhibiting material defining a reinforcing second unjoined area to said surface of said sheet adjacent said large unjoined area, superimposing a second ductile sheet weldable to said first sheet on said surface to which the weld-inhibiting material has been applied, welding said sheets together adjacent the area to which said weld-inhibiting material has been applied, simultaneously inflating with fluid pressure said reinforcing area and said large unjoined area between and against a pair of spaced flat and noncompressive platens, regulating said pressure below the yield strength of said sheets, removing the restraint of said platens against additional expansion of said large unjoined area and said reinforcing area, and thereafter expanding said large unjoined area to a height greater than said reinforcing area whereby said reinforcing area restrains distortion of said panel during said second inflation of said unjoined area.

2. A method for providing integral reinforcement against distortion in a hollow panel provided with a relatively large first unjoined area comprising applying a pattern of weld-inhibiting material to the surface of a ductile sheet defining said large unjoined area, applying weld-inhibiting material defining a reinforcing second unjoined area to said surface of said sheet adjacent said large unjoined area, superimposing a second ductile sheet weldable to said first sheet on said surface to which the weld-inhibiting material has been applied, welding said sheets together adjacent the area to which said weld-inhibiting material has been applied, simultaneously inflating with a fluid said areas defined by said large unjoined area and said reinforcing area between and against a pair of spaced flat and noncompressive platens with said fluid being at a pressure sufficiently high to rupture the metal when unsupported between said platens, reducing said pressure below the yield strength of said metal, increasing the spacing of the platens adjacent said large unjoined area and said reinforcing area a distance equal to the additional deformation desired in said large unjoined area, and thereafter expanding said large unjoined area to a height greater than said reinforcing area at a pressure sufficiently high to rupture the metal when unsupported by said platens.

3. A method for providing integral reinforcement against distortion in a hollow panel provided with a relatively large first unjoined area of a height greater than and in conjunction with a pattern of passageways connecting with said large unjoined area comprising, applying a pattern of weld-inhibiting material to the surface of a ductile sheet defining said large unjoined area and said pattern of passageways connecting with said large unjoined area, applying weld-inhibiting material defining a reinforcing second unjoined area to said surface of said sheet adjacent said large unjoined area, superimposing a second ductile sheet weldable to said first sheet on said surface to which the weld-inhibiting material has been applied, welding said sheets together adjacent the area to which said weld-inhibiting material has been applied, simultaneously inflating with fluid pressure all the unjoined areas defined by said large unjoined area, said pattern of passageways and said reinforcing area between and against a pair of spaced flat and noncompressive platens, regulating said pressure below the yield strength of said sheets, removing the restraint of said platens against additional expansion of said large unjoined area, said pattern of passageways and said reinforcing area, and thereafter freely expanding said large unjoined area to a height greater than said passageways and said reinforcing area at an elevated pressure below the rupture point of said sheet.

4. A method for providing integral reinforcement against distortion in a hollow panel provided with a relatively large first unjoined area of a height greater than and in conjunction with a pattern of passageways connecting with said large unjoined area comprising, applying a pattern of weld-inhibiting material to the surface of a ductile sheet defining said large unjoined area and said pattern of passageways connecting said large unjoined area, applying weld-inhibiting material defining a reinforcing second unjoined area to said surface of said sheet adjacent said large unjoined area, superimposing a second ductile sheet weldable to said first sheet on said surface to which the weld-inhibiting material has been applied, welding said sheets together adjacent the area to which said weld-inhibiting material has been applied, simultaneously inflating with fluid pressure all the unjoined areas defined by said large unjoined area, said pattern of passageways and said reinforcing area between and against a pair of spaced flat and noncompressive platens, regulating said pressure below the yield strength of said sheets, removing the restraint of said platens against additional expansion of said large unjoined area, said pattern of passageways and said reinforcing area, and thereafter freely expanding said large unjoined area to a height greater than said passageways and said reinforcing area at an elevated pressure between the elastic limit and the rupture point of said sheet.

5. A method for providing integral reinforcement against distortion in a hollow panel provided with a relatively large first unjoined area comprising applying a pattern of weld-inhibiting material to the surface of a ductile sheet defining said large unjoined area, applying weld-inhibiting material defining a reinforcing second unjoined area to said surface of said sheet adjacent said large unjoined area, superimposing a second ductile sheet weldable to said first sheet on said surface to which the weld-inhibiting material has been applied, welding said sheets together adjacent the area to which said weld-inhibiting material has been applied, simultaneously inflating with fluid pressure said areas defined by said large unjoined area and said reinforcing area, said inflation being between and against a pair of spaced flat and non-compressive platens, regulating said pressure below the yield strength of said sheets, removing the restraint of said platens against additional expansion of said large unjoined area and said reinforcing area, and thereafter expanding said large unjoined area to a height greater than said reinforcing area at an elevated pressure between the elastic limit and the rupture point of said sheet.

6. A method for providing integral reinforcement against distortion in a hollow panel provided with a relatively large first unjoined area comprising applying a pattern of weld-inhibiting material to the surface of a ductile sheet defining said large unjoined area, applying weld-inhibiting material defining a reinforcing second unjoined area to said surface of said sheet adjacent to and interconnected to said large unjoined area with said reinforcing area circumscribing said large unjoined area, superimposing a second ductile sheet weldable to said first sheet on said surface to which the weld-inhibiting material has been applied, welding said sheets together in the areas not separated by said weld-inhibiting material, simultaneously inflating with fluid pressure all the areas defined by said large unjoined area and said reinforcing area between and against a spaced pair of flat and non-compressive platens with said pressure being sufficiently high to rupture said sheets when unsupported between said platens, reducing said pressure below the yield strength of said sheets, increasing the spacing of said platens adjacent said large unjoined area and said reinforcing area a distance equal to the deformation desired in said large unjoined area, and thereafter additionally expanding with fluid pressure said large unjoined area to a height greater than said reinforcing area.

7. The method of claim 6 wherein said reinforcing area is provided with spaced islands devoid of said weld-inhibiting material with all said islands spaced from the periphery of said reinforcing area.

8. The method of claim 6 wherein said reinforcing area is spaced from said large unjoined area except at points of interconnection therebetween.

9. The method of claim 8 wherein said reinforcing area is provided with spaced islands free of weld-inhibiting material with all said islands spaced from the periphery of said reinforcing area.

References Cited in the file of this patent

UNITED STATES PATENTS

| | | |
|---|---|---|
| 2,333,343 | Sendzimir | Nov. 2, 1943 |
| 2,349,695 | Beane | May 23, 1944 |
| 2,472,937 | Brinkoeter | June 14, 1949 |
| 2,587,116 | Clay | Feb. 26, 1952 |
| 2,662,273 | Long | Dec. 15, 1953 |
| 2,690,002 | Grenell | Sept. 28, 1954 |
| 2,700,211 | Woolf | Jan. 25, 1955 |
| 2,740,188 | Simmons | Apr. 3, 1956 |
| 2,779,168 | Jacobs et al. | Jan. 29, 1957 |
| 2,896,312 | Schell | July 28, 1959 |
| 2,915,296 | Johnson | Dec. 1, 1959 |